Oct. 11, 1938.　　　D. E. JACOBS　　　2,132,568
PLANT GUARD
Filed Sept. 22, 1937　　　3 Sheets-Sheet 1
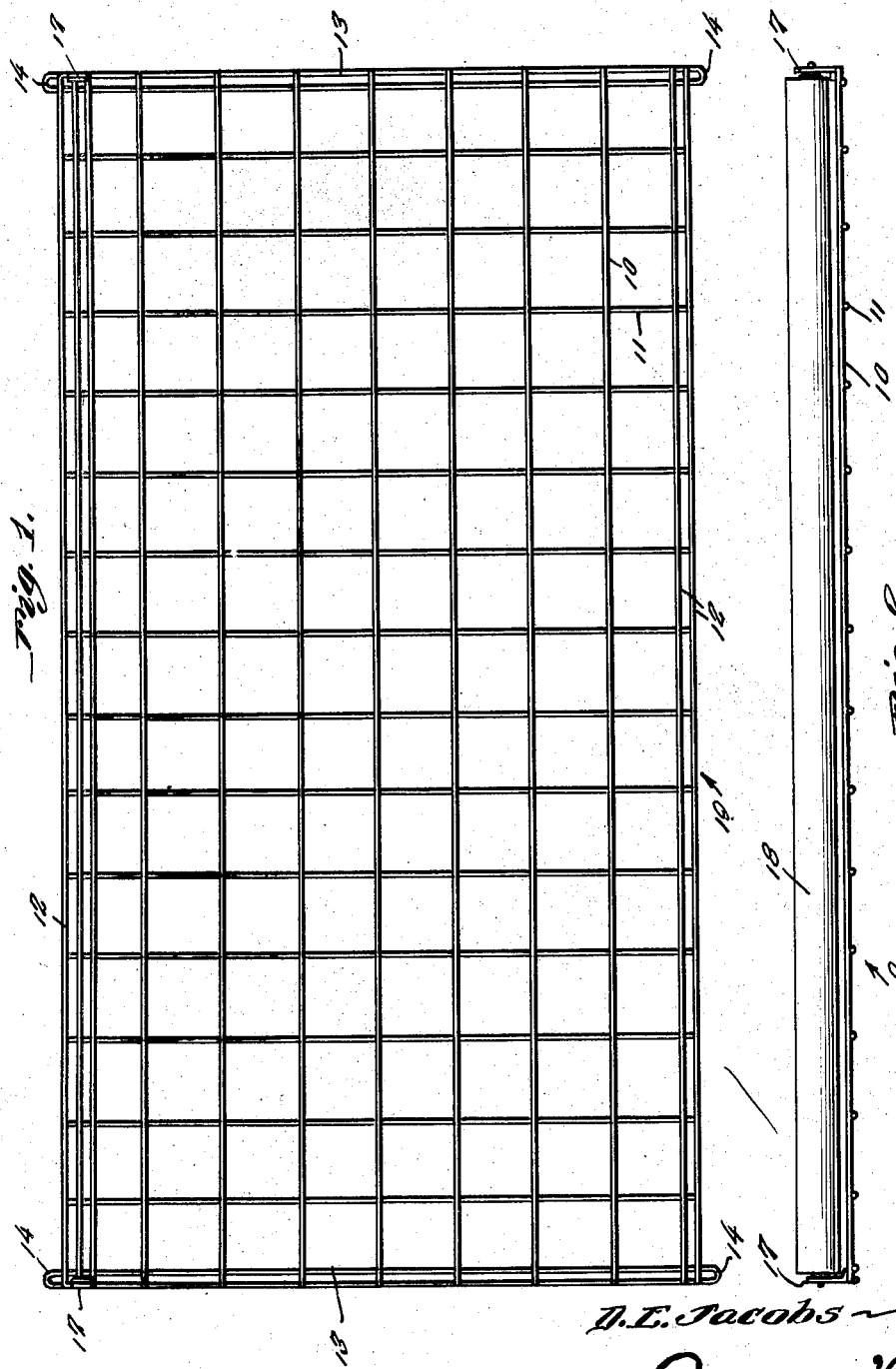
Inventor
D. E. Jacobs
By Clarence A. O'Brien
Hyman Berman
Attorneys Oct. 11, 1938.　　　D. E. JACOBS　　　2,132,568
PLANT GUARD
Filed Sept. 22, 1937　　3 Sheets-Sheet 2
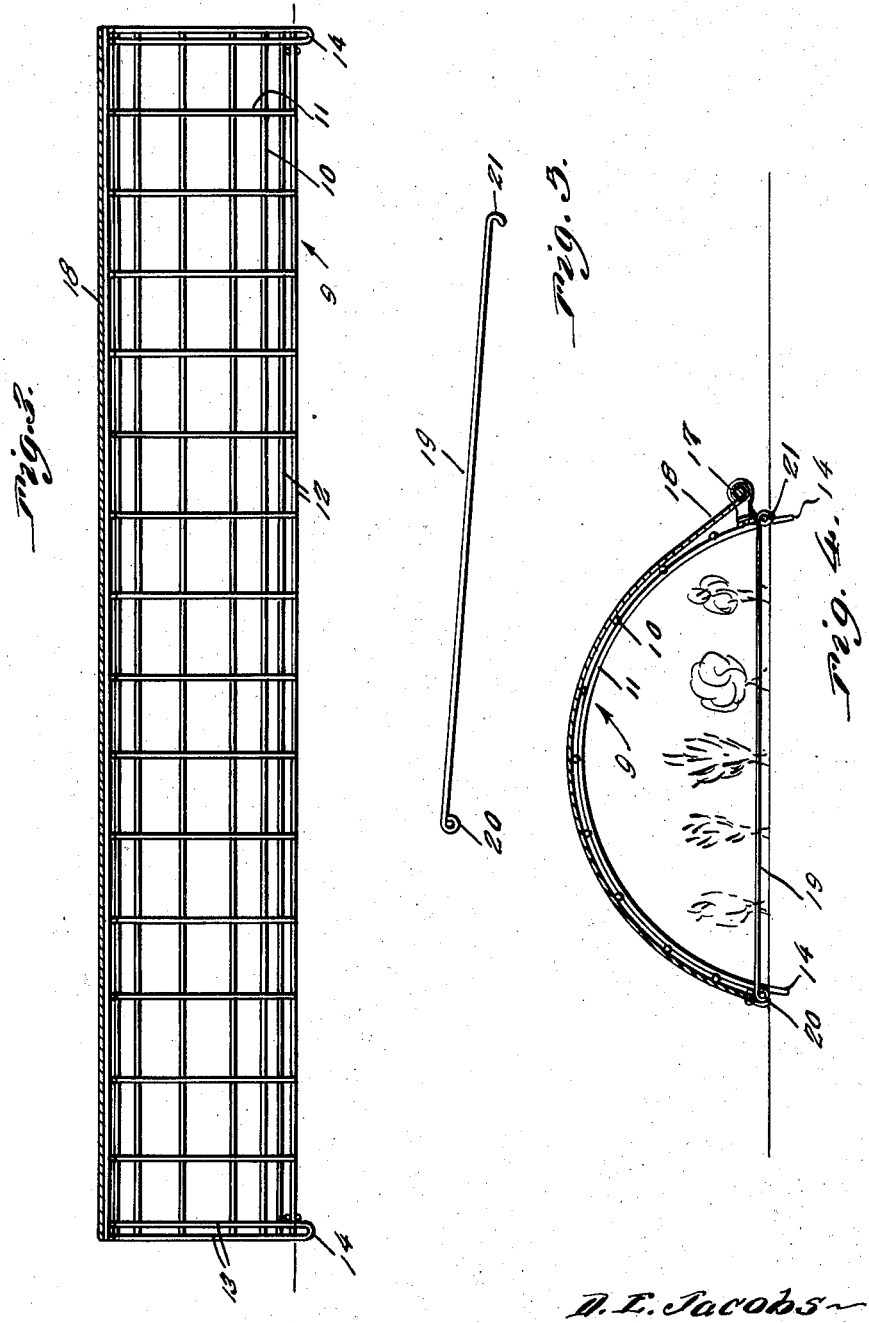
Inventor
D. E. Jacobs
By Clarence A. O'Brien
Hyman Berman
Attorneys Oct. 11, 1938.   D. E. JACOBS   2,132,568
PLANT GUARD
Filed Sept. 22, 1937    3 Sheets-Sheet 3
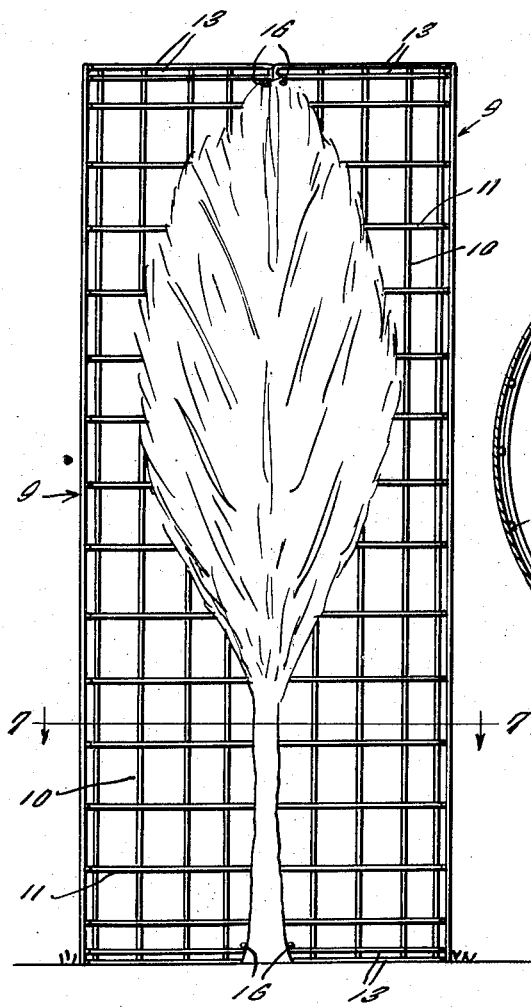
Fig. 6.
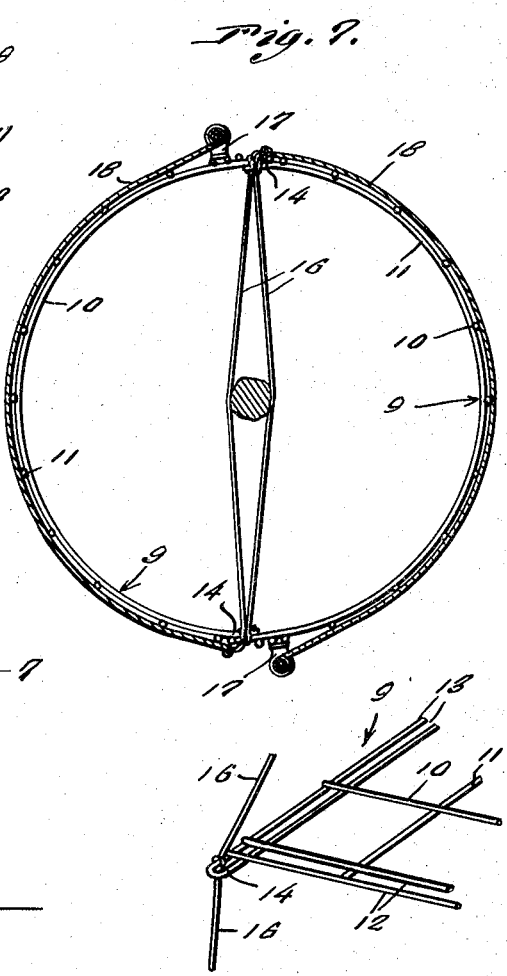
Fig. 7.
Fig. 8.
Inventor
D. E. Jacobs
By Clarence A. O'Brien
Hyman Berman
Attorneys Patented Oct. 11, 1938

2,132,568

UNITED STATES PATENT OFFICE 2,132,568

PLANT GUARD

Dennis E. Jacobs, Wauchula, Fla., assignor of one-half to William J. Leimbach, Cleveland, Ohio Application September 22, 1937, Serial No. 165,190

1 Claim. (Cl. 47—31)

The present invention relates to that class of accessories and appliances embodying guards, shields and similar sheltering devices employed in connection with trees, plants and flowers to shade and otherwise protect the same against the detrimental effects of broiling sun rays or frosty air.

The principal object of my invention is to provide a simply constructed screen-like guard normally flat but bendable into semi-circular arched form and embodying a roller type screen susceptible of being brought into use as desired and mounted on the guard so as not to interfere with bending of the guard while the screen is in use.

Manifestly, it is my aim to generally improve upon known marketed and patented so-called plant and tree protectors by providing an assemblage or structure possessed of appreciable refinements and structural distinctions such as provide individuality and perform in effectively accomplishing the desired results in a reliable manner.

Of outstanding importance in the improvement herein claimed is the fact that I have found it expedient and practicable to use an open wire grid-like frame, this being composed of interconnected intersecting wires of a flexible character whereby to allow said frame to be bowed or arched to provide an effective guard and to at the same time provide an equally effective support for the rollable curtain or other protective covering used in connection therewith. By this association of features it is possible to utilize simple hook or latch means to maintain the frame arched when needed or to allow it to be straightened into a flat formation permitting it to be conveniently stored and transported.

Other features and advantages will become more readily apparent from the following description and accompanying illustrative drawings.

In the drawings:

Figure 1 is a top plan view of the reticular guard or screen in its normal flat state.

Figure 2 is what may be called an edge view of the same detailing to advantage the rolled transparent sheet material forming the covering or curtain.

Figure 3 is a longitudinal view showing the device arched and set up for use as a guard or shield for plants.

Figure 4 is a transverse section taken centrally or otherwise through Figure 3.

Figure 5 is a perspective view of the so-called hooked retention latch.

Figure 6 is a view showing how two of the semi-circular screens can be bowed and placed side-by-side to form a cylindrical inclosure for a tree or the like.

Figure 7 is a horizontal section on the line 7—7 of Figure 6.

Figure 8 is a detail perspective view showing one corner portion of the especially bent wire frame.

Referring now to the drawings by distinguishing reference numerals, it will be observed that the reticular or screen frame forming the nucleus of the structure is denoted by the numeral 9. As before indicated, this is normally flat and of general rectangular form. It is composed of resilient bendable wires. The main or principal area is made up of longitudinal and transverse complemental wires 10 and 11. The rim portion is made up of pairs of reinforcing wires. That is, there are two longitudinal sets 12 and two transverse or end sets 13. The end portions of the looped wires 13 are extended, as indicated at the points 14 to define projecting eyes to accommodate tie cords 16 to facilitate bending and fastening the device around a tree or similar plant, as illustrated for instance in Figure 6.

Each lattice or screen frame 9 is provided with fixtures or brackets 17 to accommodate a roller on which the protective curtain 18 is wound. While this could be a spring roller, it need not be, for a simple rod will do for winding purposes. Under general weather conditions when the sun is not too hot, or frost in the air is not present, the curtain is obviously rolled up so as to provide for effective ventilation of the inclosed or enveloped tree or plant. When, however, weather conditions require it, the curtain is unwound and brought into use, as illustrated in Figure 5. In this arrangement we see a simple frame unit arched upon itself to provide a semi-circular hood for the desired area in the bed of plants. In this arrangement, as a general proposition, it is desirable to provide stay wires or latches. Each latch or wire is denoted by the numeral 19, as indicated in Figure 5, and has an eye 20 at one end hingedly attached to the frame structure. The opposite end is formed into a keeper hook 21 to be engaged with the opposite parallel side of the frame. By bowing the frame and then hooking the latch in place it is obvious that it maintains the frame in this state. Then whenever necessary the curtain can be stretched over the frame, as seen in Figure 4, and tied or otherwise fastened in place.

When it is desired to cage or partially house a tree, it becomes a simple matter to take two of the screen or frame units 9 and place them in vertical companion relationship. They are properly bowed and tied together in this companionate bowed state through the instrumentality of the aforementioned cords or equivalent fastening elements 16.

The essence of the invention resides in the provision of a single or double unit cage characterized by a bendable reticular or lattice-type resilient frame provided with bowing and retaining stays of the type shown at 19 in Figure 5. Added to this is the ever-present rollable curtain susceptible of being brought easily into use whenever necessary or desired. With this arrangement it is obvious that smudge pots and orchard heaters and the like may be employed and in fact housed within the cage to effectively dissipate frost. Consequently, it will be seen that it is not so much the matter of planning or use of the invention which is considered to be important as it is the particular construction of the reticular screen unit equipped with a curtain and bowing and retention means.

The novelty may be visualized as predicated on two concepts, that is, the one in which we see the device, employed as a horizontal ground-type guard in Figure 5. Secondly, through the use of the same fundamental structure, it is possible to employ two of the guards in companionate relationship to form a cage for perpendicular disposition to surround a small tree or the like. When the devices are employed in pairs as visualized in Figure 6, it is to be observed that the aforementioned eyes 14 come in handily; that is to say, the eyes of the respective guards are disposed in overlapping relationship, as brought out to advantage in Figure 7. This puts the eyes in a relationship to enable them to accommodate the aforesaid cords 16. The cords can be tied, knotted, or otherwise joined with the overlapping eyes, as illustrated, to maintain the respective parts 9 in cage-forming relationship. These cords are not depended on entirely, as is obvious, to maintain the parts in said cage relationship. That is to say, the aforementioned hooks 19 function to maintain the arcuate bend. The cords are primarily used to hold the parts assembled around the tree, or rather the trunk of the tree.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A protector of the class described, comprising an elongated rectangular member of resilient screen material normally reactive toward a flat condition and flexible into transversely arched form, a roller mounted at one side edge of the member on the same to extend along said edge, a curtain on said roller having a free edge attachable to the opposite side edge of the member at will, said roller being freely rotatable to feed the curtain therefrom, whereby the member may be flexed from normal condition with said curtain attached to said side edge thereof, hooked locking bars pivoted to one side edge of the member to take over the other side edge thereof in the arched position of said member and thereby retain the same in arched form, and cords attached at one end to one side edge of the member for looping through the member at the opposite side edge thereof to bend said member into arched form by pull exerted on the opposite ends thereof.

DENNIS E. JACOBS.